United States Patent [19]

Wah Lo

[11] Patent Number: 4,800,407

[45] Date of Patent: Jan. 24, 1989

[54] TOTAL FOCUS 3-D CAMERA AND 3-D IMAGE STRUCTURE

[76] Inventor: Allen K. Wah Lo, 5022 Hidden Branches Dr., Dunwoody, Ga. 30338

[21] Appl. No.: 150,977

[22] Filed: Feb. 1, 1988

[51] Int. Cl.$^4$ ............................................. G03B 35/08
[52] U.S. Cl. .................................... 354/114; 354/115; 355/22
[58] Field of Search ............... 354/112, 114, 115, 294; 355/22, 77; 350/130; 352/58

[56] References Cited

U.S. PATENT DOCUMENTS

| | | | |
|---|---|---|---|
| 2,966,095 | 12/1960 | Waller | 354/114 X |
| 3,895,867 | 7/1975 | Lo et al. | 354/115 X |
| 3,953,869 | 4/1976 | Lo et al. | 354/115 |
| 4,037,950 | 7/1977 | Lo et al. | 352/58 |
| 4,063,265 | 12/1977 | Lo et al. | 354/294 |
| 4,086,585 | 4/1978 | Lo et al. | 354/115 |
| 4,650,282 | 3/1987 | Lo | 354/115 X |
| 4,687,310 | 8/1987 | Cuvillier | 354/115 |

FOREIGN PATENT DOCUMENTS 164747  5/1949  Austria ................................ 354/114

Primary Examiner—Richard A. Wintercorn
Attorney, Agent, or Firm—Harold L. Marquis

[57] ABSTRACT

Three-dimensional photographs are produced in which there are three image bands within each lenticule in which each image band is between 8.5 degrees and 11 degrees in width in order to permit a photograph to be viewed from wider angles so that the eyes will see adjacent stereo pairs from any viewing angle and the picture will be in total focus. A three lens camera is provided to take these photographs.

5 Claims, 3 Drawing Sheets

TOTAL FOCUS 3-D CAMERA AND 3-D IMAGE STRUCTURE

BACKGROUND OF THE INVENTION

In lenticular type three-dimensional (3-D) photography, a plurality of two-dimensional (2-D) views of the scene are taken from a number of horizontally spaced vantage points and the series of 2-D images is then compressed and printed at the focal plane of each of the lenticules of the lenticular screen to form a 3-D composite image of the field.

In the past, a minimum of four 2-D views were used to compose a 3-D picture and each of the plurality of compressed 2-D lineiform image bands occupied an equal width in the lenticule. An even number of image bands was also always used. Several images may be printed within a single band. This has commonly been referred to as W/N, wherein "W" is the width of each lenticule and "N" is the number of 2-D image bands to be used in the total composition, and the lineiform image bands of the stereo pairs are arranged in a symmetrical relationship to the center of the curvature of the lenticular screen of the lenticule.

When a person is viewing a 3-D photograph, the ideal situation is for the eyes to see a stereo pair of adjacent 2-D lineiform image bands. Thus as illustrated in FIG. 1, the eyes should see image bands 1 and 2, 2 and 3 or 3 and 4 so that the proper parallax between the pair of 2-D images can be maintained in order to construct a 3-D image that is in focus and not blurred. Parallax is the apparent shift in position of an element of an object field due to the relative change in position of the element and the place from which the element is viewed. In viewing three dimensional photographs of the past, the eyes do not always see the stereo pair formed by the adjacent 2-D image bands. Frequently, the eyes will see non-adjacent stereo pairs formed by image bands 1 and 3, 2 and 4, or 1 and 4 as shown in FIG. 1 according to the angle and the distance of viewing the photograph. When the eyes see a stereo pair where the image bands are non-adjacent, they do not fuse the pair of images together to form a solid image because of the excessive parallax between them.

The minimum number of 2-D views used to compose 3-D photographs of the past is four with the normal viewing angle of the lenticule of the print material being from approximately 20 to 30 degrees. Consequently, each 2-D image band covers an angle of less than $7\frac{1}{2}$ degrees. At a normal viewing distance of 15 inches, the eyes will view through an angle of approximately 10 degrees of the lenticule. Unless the 3-D photograph is held exactly at the center between the eyes and perpendicular thereto, the eyes will see a non-adjacent stereo pair which will be formed by image bands 1 and 3, 2 and 4, or 1 and 4 as shown in FIG. 1, 2 and 3.

PRIOR ART

U.S. Pat. No. 3,895,867 (Lo, et al) discloses a method of making 3-D pictures where the lineiform image bands are arranged where there are four or more lineiform image bands which are arranged in symmetrical order about the perpendicular line intersecting the center of the curved screen of the lenticule. Okoshi in *Three-Dimensional Imaging Techniques* (1976) on pages 71–88 discloses the spread of the image on the emulsion in 3-D printing.

The following U.S. patents are also disclosed as of interest: U.S. Pat. Nos. 3,953,869 (Lo, et al), 4,037,950 (Lo, et al); 4,063,265 (Lo, et al) and 4,086,585 (Lo, et al).

SUMMARY OF THE INVENTION

It is an objective of this invention to produce an autostereoscopic 3-D photograph of improved quality. In particular, it is an object to produce a photograph that can be viewed within a greater range of viewing angles and distances in total focus without blurring than present 3-D photographs. It is a further objective to produce a 3-D photograph of close-up objects in which the parallax is increased between the adjacent stereo pairs in order to give the photograph an appearance of greater depth.

It is a further objective of this invention to provide a camera that has a capability of taking pictures to produce 3-D photographs that accomplish these objectives.

It has been discovered that these objectives can be achieved by limiting the number of 2-D views taken by the camera to 3, and increasing the width of each lineiform image band to an angle of at least 8.5 degrees. When the width of each 2-D image band is at least 8.5 degrees of the lenticule it prevents the eyes from seeing images 1 and 3. In the event the eyes should see image bands 1 and 3, the photography will appear to be out of focus as the eyes will not be able to fuse those two images together because of the excessive parallax between them in normal consumer photography where the photograph of the object is taken at close range. By increasing the width of the image band from $7\frac{1}{2}$ to at least 8.5 degrees to accommodate the viewing angle of the eyes, only image bands 1 and 2 or 2 and 3 as shown in FIG. 4 will be seen as stereo pairs as the proper parallax is maintained so that the eyes can fuse the pair of stereo image bands together to reconstruct a single sharp 3-D image. Limiting the number of 2-D image bands to three is contrary to the teachings of the past when it was thought that a greater number of 2-D views should be used to produce 3-D pictures as it would enhance the 3-D effect and result in smoother transition between the stereo pairs. It was also thought that there should be an even number of image bands in the lenticule to accommodate the fact that human beings have two eyes. A three lens camera with the lenses spaced an equal distance apart is used to accomplish the objectives desired in the photographs produced in accordance with this invention.

DETAILED DESCRIPTION OF THE DRAWINGS

Figure 1:
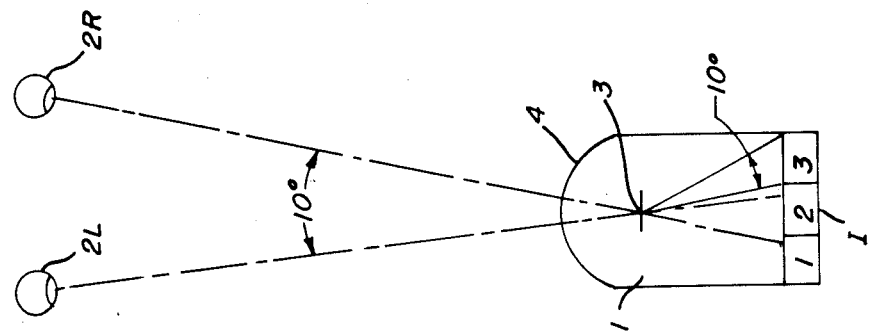
FIG. 1 is a diagrammatic view showing the normal way of viewing a three-dimensional photograph with four image bands arranged in a symmetrical order on each side of the center of the lenticular screen.

FIG. 1 illustrates a person viewing stereo pairs 2 and 3 in the lenticule 1 of a 3-D picture. The lenticule has four 2-D lineiform image bands I (1, 2, 3, and 4). Image bands 1 and 2, 2 and 3, 3 and 4 constitute stereoscopic image pairs. These image bands I are formed on photosensitive material. FIG. 1 illustrates the human eyes 2L and 2R viewing the lenticule with a perpendicular line passing through the center of the lenticular screen 4 intersecting the center between the two eyes 2R and 2L of the viewing person. The eyes are shown to be 2½ inches apart which is the average distance between the eyes of human beings. The viewing angle covers approximately 10 degrees when the eyes are 15 inches from the photograph. When the photograph is so held, the observer will see stereoscopic image pairs 2 and 3 which covers a 15 degree angle in which the 10 degree viewing angle falls. The eyes will focus at the focal plane 3 of the lenticule 1.

Figure 2:
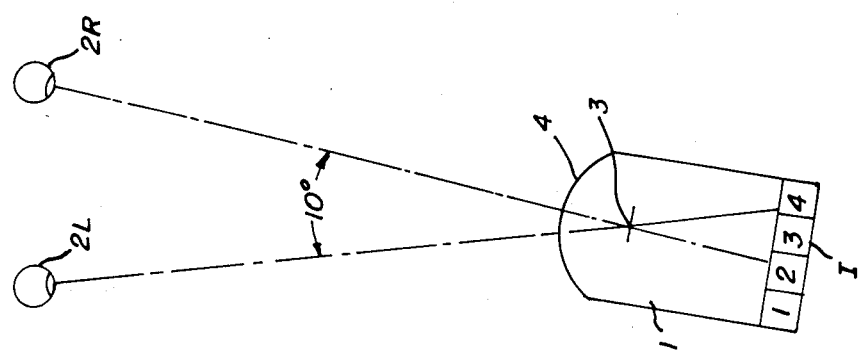
FIG. 2 is a diagrammatic view showing a lenticule of FIG. 1 in which the viewing angle is skewed to the right side of the lenticular screen.

FIG. 2 illustrates the viewing of the lenticule when the photograph is held a few degrees off the perpendicular line between the center of the lenticule and the center between the eyes. In this case the photograph is held so that it is skewed to the right of the lenticular screen 4. As the viewing angle is 10 degrees and each image band is 7½ degrees wide, the eyes will see non-adjacent stereo image pairs 1 and 3 when the photograph is so held. Because of the parallax between these image pairs, the photograph will be blurred and not in total focus.

Figure 3:
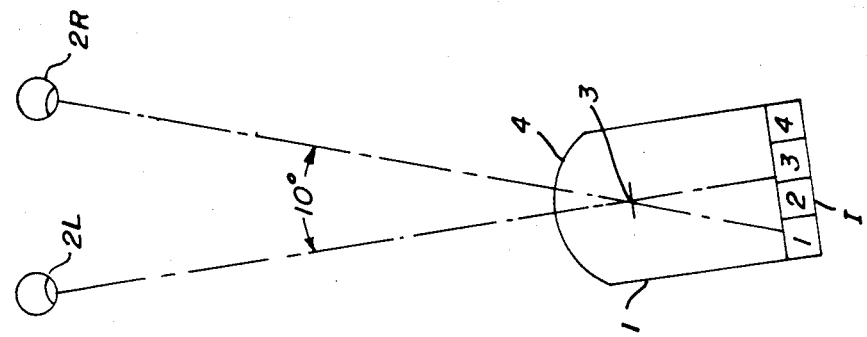
FIG. 3 is a diagrammatic view showing a lenticule of FIG. 1 in which the viewing angle is skewed to the left side of the lenticular screen.

FIG. 3 illustrates the viewing of the lenticule when the photograph is skewed to the left of the center line between the center of the lenticular screen 4 and the center between the eyes. As in the case of FIG. 2 the viewing angle is still 10 degrees while each image band covers 7½ degrees of the lenticule. This results in the eyes seeing non-adjacent stereo image pairs 2 and 4 with the photograph appearing blurred and not in total focus due to the excessive parallax between these images.

Figure 4:
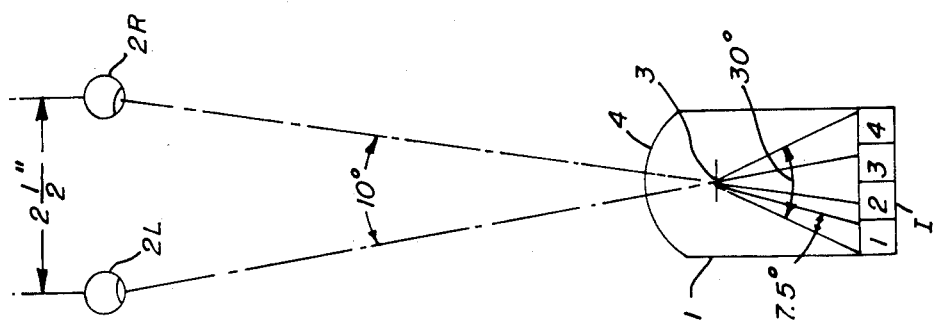
FIG. 4 is a diagrammatic view viewing a 3-D picture with three image bands of the lenticule which cover 8.5 to 11 degrees of the viewing angle.
Figure 5:
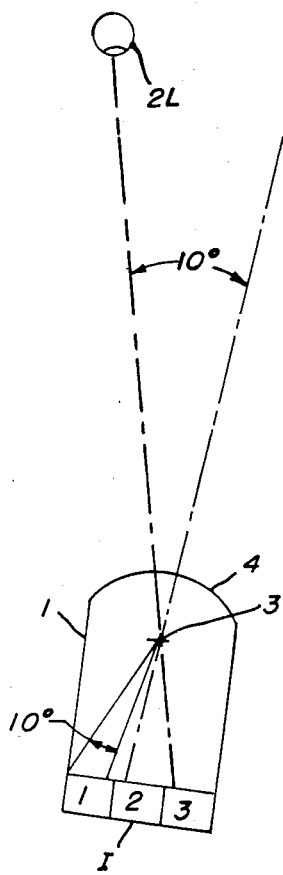
FIG. 5 is a diagrammatic view showing the lenticule of FIG. 4 in which the viewing angle is skewed to the left of the lenticular screen.

FIG. 4 illustrates a lenticule in which there are only 3 image bands I (1, 2 and 3). In this case the viewer is viewing the photograph from an angle with which the perpendicular line intersecting the center between the lenticular screen 4 also intersects the center of the eyes. Under these circumstances, the viewer still will see the stereoscopic pairs formed by image bands 1 and 2 if the lenticular screen is skewed slightly to the right and pairs 2 and 3 if skewed slightly to the left. Each of these image band pairs occupies 10 degrees of the lenticule. Since the viewing angle is 10 degrees the eyes will only see an adjacent pair of image bands. Consequently, the photograph can be tilted or held off-center to the eyes as shown in FIG. 5 where the photograph is held so that the perpendicular line passing through the center of the lenticular screen 4 intersects closer to the right eye than to the left eye. Under these circumstances, the viewer will see stereoscopic pairs 2 and 3. Consequently, with the use of 3 image bands in which the viewing angle is at least 8.5 degrees the photograph can be tilted or held off-center to the eyes to a greater extent than 3-D photographs in which the stereoscopic pairs are formed between pairs of 4 or more image bands. Because there are only three image bands in each lenticule, the image bands are arranged in an offset format in relation to the center of the lenticule so that a perpendicular line from the center of the screen of the lenticule to the photosensitive material intersects near the midpoint of the center image band.

In order to insure that the eyes only see adjacent stereoscopic pairs it is essential that the width of each image band be between 8.5 and 11 degrees. If the width is less than 8.5 degrees it is possible for the eyes to see non-adjacent pairs as the viewing angle between the eyes is 10 degrees. If the total viewing angle of the lenticule is 30 degrees it is essential that the width of each image band be no greater than 11 degrees. If it were greater than 11 degrees it would not be possible to place two stereoscopic pairs within the lenticule. If there are only two image bands of 15 degrees each both eyes will see only one image as the viewing angle between the eyes is 10 degrees.

It should be pointed out that it is not practical to have a lenticular screen of greater than 30 degrees because of the vignetting and distortion effects. By vignetting we mean that the light reaching the image band falls off towards the edge of the lenticular screen resulting in a dark picture. This effect is characteristic of all lenses as the light falls off near the outside of the lens. It would be possible to have more image bands of 10 degrees or so in a lenticulr screen 40 degrees or greater. This is not practical because of the vignetting and distortion effect.

Consequently, the only practical solution to the problem of producing a high quality 3-D photographs is to utilize lenticular screens of approximately 30 degrees with three image bands.

While the range of the image band can be from approximately 8½ to 11 degrees, it is preferred that the image band be between 8½ and 10 degrees in width. This range will permit production of high quality pictures because the eyes will only see adjacent images. When non-adjacent images are viewed by the eyes distortion results.

Figure 9:
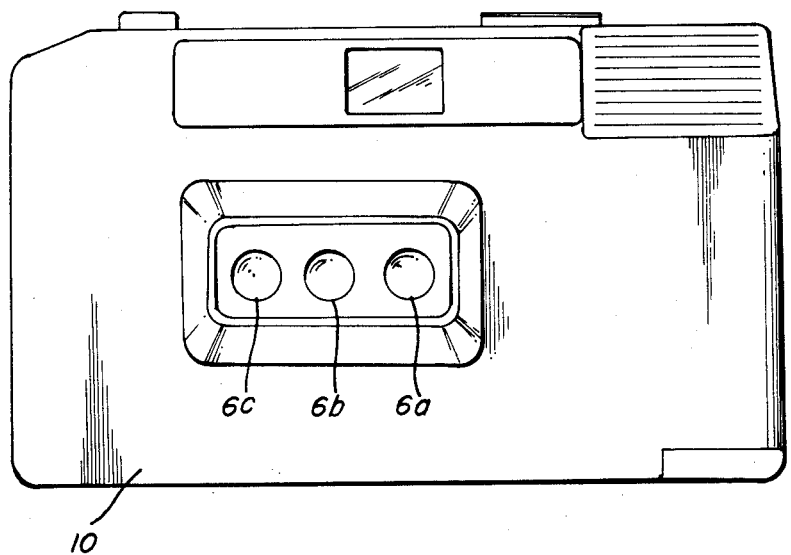
FIG. 9 is a front elevation view of a three lens camera of this invention.

The stereoscopic pictures of this invention can be taken by a single lens camera. One method of taking these pictures with a single lens camera is to move the camera to three different positions in relation to the object and take a picture at each position. Alternatively the object can be moved to three different positions in relation to the camera. For convenience it is preferred that the stereoscopic pictures of this invention be taken by a new and novel three lens camera as illustrated in FIG. 9.

Figure 6:
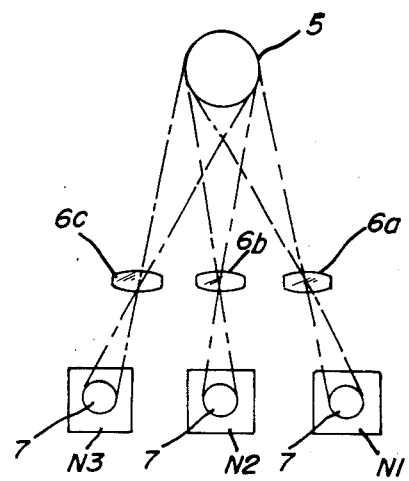
FIG. 6 is a diagrammatic view of the process of taking a stereoscopic picture with a three lens camera.
Figure 7:
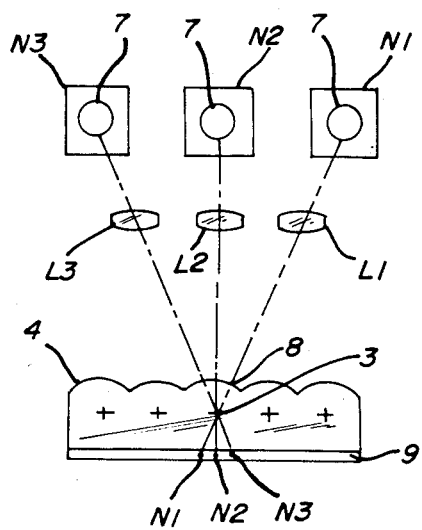
FIG. 7 illustrates a process of composing stereoscopic pictures taken by a 3 lens camera onto lenticular photographic material.

As illustrated in FIG. 6, a stereoscopic camera with three lenses 6a, 6b and 6c takes a photograph of an object 5 with each of the lenses being positioned at a different horizontal position in relation to the subject 5. This produces three negatives (N1, N2 and N3) with images 7. These negatives are then composed as shown in FIG. 7 through enlarging lenses (L1, L2 and L3) or with a single lens enlarger which focuses the images 7 onto the photosensitive material 9 of the lenticule 1 of the photograph 8. The images are focused through the lenticular screen 4 to the focal point 3 and onto the photosensitive material to form the stereoscopic image bands (N1, N2 and N3) as shown in FIG. 7. In the enlarging process illustrated in FIG. 7, each image (e.g.

Figure 8:
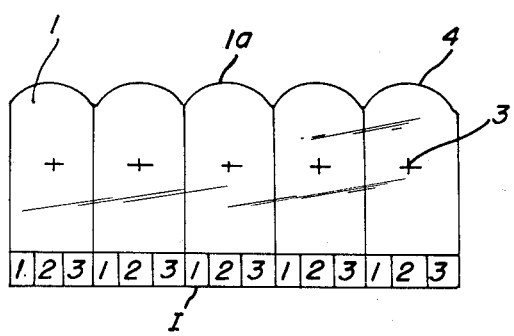
FIG. 8 is a diagrammatic view of the stereoscopic lenticular photographic material showing several lenticules with three image bands in each lenticule.

N2) can be projected onto the appropriate image band 5 in a side-by-side relationship several times to fill the entire width of the image band. If this were done in the case of image band 1 in lenticule 1a as shown in FIG. 8 each of the images in that image band 1 would be identical. It is also possible to use the scanning technique of printing as described in prior at article, Okoshi in *Three-Dimensional Imaging Techniques* (1976) on pages 71–88 to spread the images across each band 1 in lenticule 1a as shown in FIG. 8. If it is desired to have a single image on each image band, the aperture of the enlarger can be opened a sufficient width so that a single image fills the entire image band.

FIG. 8 illustrates a plurality of lenticules within a photograph with each lenticule having 3 image bands which are filled in a manner disclosed above.

The camera 10 illustrated in FIG. 9 has three lenses 6a, 6b and 6c. The three lenses are all arranged in the same horizontal plane and the distance between the adjacent lenses is identical. The camera otherwise is of conventional construction.

The lenticular structure of this invention in which only three image bands are composed in each lenticule offers a tremendous advantage in allowing photographs to be viewed at much wider viewing angles and distances than prior photographs. It is not at all necessary to view the lenticular screen of the photograph from the same distance and position that the two dimensional frames were projected during composing. For example, in viewing lenticule 1a in FIG. 8 when there are a number of images in image band 2 the eyes will focus on a particular image within this wider image band even though it is viewed at a different angle from that at which the picture is taken. When there is a single image in image band 2 of lenticule 1a of FIG. 8 this image will be seen even though the picture is being viewed from a tilted angle from the normal viewing position. A picture can be tilted or held at varying distances and not interfere with the quality of the picture which is not the case with past 3-D photographs.

As described above it is extremely important that the width of the image band be at least 8.5 degrees and not more than 11 degrees to achieve the 3-dimensional photographs meeting the objectives desired. If the width of an image band is less than 8.5 degrees, the eyes may see non-adjacent stereo pairs when the photograph is tilted. The image band cannot be greater than 11 degrees as both eyes will see the same image band because it is not possible to put two stereoscopic pairs within each lenticule. It is essential to have at least two stereoscopic pairs in order to achieve desired 3-dimensional effect. 3-D photographs of the past were not of high quality because of the fact that the viewer frequently saw non-adjacent image bands when the photograph was tilted. This resulted in the pictures being in poor focus or distorted when held at various positions by the viewer. This problem has been solved by reducing the number of image bands to three. It has always been thought in the past that it was necessary to have at least four image bands and for there to be an even number of image bands. It has also been discovered that these image bands must be between $8\frac{1}{2}$ and 11 degrees in width and that the lenticule must be approximately 30 degrees in width. All these characteristics are essential to producing high quality 3-D photographs.

I claim:

1. An image array formed on the photosensitive surface of lenticular print film, said image array consisting of two stereoscopic image pairs within a group of three image bands in each lenticule.

2. The image array of claim 1 in which each image band occupies space between approximately $8\frac{1}{2}$ and 11 degrees of the viewing angle of the lenticule.

3. The image array of claim 2 in which there is a plurality of identical images of the same two-dimensional view in each image band in a side-by-side relationship.

4. The image array of claim 2 in which there is a single image in each image band.

5. A three lens three-dimensional camera in which the lenses are arranged in substantially the same horizontal plane with the distance between adjacent lenses being equal and determined by the focal length of the lenses and size of the negative being utilized so that when the film is projected onto lenticular photographic material so that the image taken through the center lens of the camera is projected onto the photographic material at the center of the lenticule with the images from the other two lenses being projected on each side thereof.

* * * * *

REEXAMINATION CERTIFICATE (1341st)
United States Patent [19]
Lo

[11] B1 4,800,407
[45] Certificate Issued  Aug. 21, 1990

[54] TOTAL FOCUS-3-D CAMERA AND 3-D IMAGE STRUCTURE

[76] Inventor: Allen K. W. Lo, 5022 Hidden Branches Dr., Dunwoody, Ga. 30338

Reexamination Request:
No. 90/001,767, May 2, 1989

Reexamination Certificate for:
Patent No.: 4,800,407
Issued:

[51] Int. Cl.$^5$ .............................................. G03B 35/08
[52] U.S. Cl. .................................... 354/114; 354/115; 355/22
[58] Field of Search ............... 354/112, 114, 115, 294; 355/22, 77; 350/130; 352/58

[56] References Cited
U.S. PATENT DOCUMENTS 3,895,867  7/1975  Lo et al. ................................. 355/77
3,953,869  4/1976  Lo et al. ................................. 354/115
4,086,585  4/1978  Lo et al. ................................. 354/115

OTHER PUBLICATIONS

Dudley, Leslie P., "Autostereoscopic Processes," Applied Optics and Optical Engineering, (Rudolf Kingslake), Academic Press, New York, N.Y. (1965), pp. 114-116.

*Primary Examiner*—Richard A. Wintercorn

[57] ABSTRACT

Three-dimensional photographs are produced in which there are three image bands within each lenticule in which each image band is between 8.5 degrees and 11 degrees in width in order to permit a photograph to be viewed from wider angles so that the eyes will see adjacent stereo pairs from any viewing angle and the picture will be in total focus. A three lens camera is provided to take these photographs.

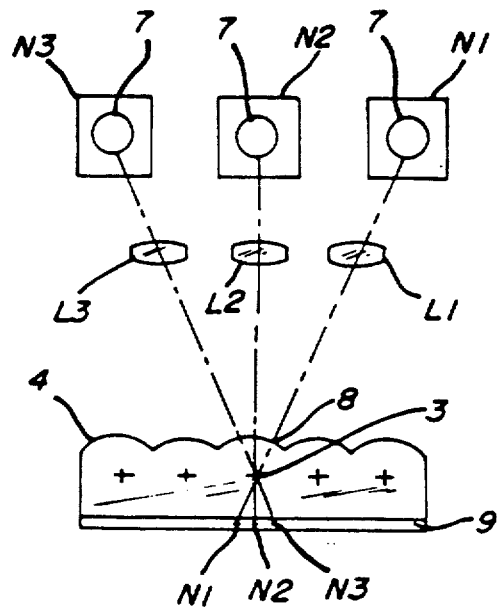

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

Claims 2 and 5 are determined to be patentable as amended.

Claims 3 and 4, dependent on an amended claim, are determined to be patentable.

2. [The] *An* image array [of claim 1] *formed on the photosensitive surface of lenticular print film, said image array consisting of two stereoscopic image pairs within a group of three image bands in each lenticule,* in which each image band occupies space between approximately 8½ and [11] *10* degrees of the viewing angle of the lenticule[.] *so that the viewer will only see adjacent stereoscopic image pairs in viewing the image array in order to minimize blurring when viewing at various distances or when the image array is tilted in relation to the line of sight of the viewer.*

5. A three lens three-dimensional camera in which the lenses are arranged in substantially the same horizontal plane with the distance between adjacent lenses being equal and determined by the focal length of the lenses and size of the negative being utilized so that when the film is projected onto lenticular photographic material so that the image taken through the center lens of the camera is projected onto the photographic material at the center of the lenticule with the images from the other two lenses being projected on each side thereof, with each of these images occupying a space between approximately 8½ and 10 degrees of the viewing angle of the lenticule in such a manner that the viewer only sees adjacent stereo images in viewing the photograph in order to minimize blurring when viewing the photograph from various distances or when tilted in relation to the line of sight of the viewer.

* * * * *